US012769840B2

(12) United States Patent
El-Azzami et al.

(10) Patent No.: US 12,769,840 B2
(45) Date of Patent: Oct. 20, 2026

(54) MANAGING FIRMWARE UPDATES USING OUT OF BAND METHODS

(71) Applicant: Dell Products L.P., Round Rock, TX (US)

(72) Inventors: Bassem El-Azzami, Austin, TX (US); Richard M. Tonry, Georgetown, TX (US); Luis Antonio Valencia Reyes, Waxahachie, TX (US); Abeye Teshome, Austin, TX (US); Adolfo Sandor Montero, Pflugerville, TX (US); Mohit Arora, Frisco, TX (US); Vinodkumar Vasudev Ottar, Mckinney, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/425,228

(22) Filed: Jan. 29, 2024

(65) Prior Publication Data

US 2025/0245334 A1 Jul. 31, 2025

(51) Int. Cl.
*G06F 21/57* (2013.01)
*G06F 8/654* (2018.01)
(Continued)

(52) U.S. Cl.
CPC ............ *G06F 21/572* (2013.01); *G06F 8/654* (2018.02); *G06F 11/1441* (2013.01); *H04L 63/18* (2013.01)

(58) Field of Classification Search
CPC ............... G06F 8/60–66; G06F 21/572; G06F 11/1441; H04L 63/18
(Continued)

(56) References Cited

U.S. PATENT DOCUMENTS 7,484,084 B1 * 1/2009 Ranaweera ............. G06F 8/656 713/1
8,042,182 B2 10/2011 Milani Comparetti et al.
(Continued)

FOREIGN PATENT DOCUMENTS

WO 2024102715 A1 5/2024

OTHER PUBLICATIONS

Intelligent Platform Management Interface, Wikipedia, 2022, 7 pages, [retrieved on Oct. 15, 2025], Retrieved from the Internet: <URL: https://web.archive.org/...946/https://en.wikipedia.org/wiki/Intelligent_Platform_Management_Interface#Baseboard_management_controller>.*

(Continued)

*Primary Examiner* — Geoffrey R St Leger
(74) *Attorney, Agent, or Firm* — WOMBLE BOND DICKINSON (US) LLP

(57) ABSTRACT

Methods and systems for managing firmware update events for data processing systems are disclosed. A firmware update event may indicate that an updated firmware image is available for hardware resources of a data processing system. A management controller for the data processing system may utilize an out of band communication channel to obtain the updated firmware image from a server while bypassing hardware resources of the data processing system. The updated firmware image may be verified, stored, and utilized to update firmware for the hardware resources to obtain an updated data processing system. The updated data processing system may provide computer-implemented services.

20 Claims, 5 Drawing Sheets

(51) Int. Cl.
*G06F 11/14* (2026.01)
*H04L 9/40* (2022.01)

(58) Field of Classification Search
USPC .................................................. 717/168–178
See application file for complete search history.

(56) References Cited

U.S. PATENT DOCUMENTS

| | | | | |
|---|---|---|---|---|
| 8,474,016 | B2 | 6/2013 | Charley | |
| 8,615,785 | B2 | 12/2013 | Elrod et al. | |
| 8,924,620 | B2 | 12/2014 | Harriman et al. | |
| 9,215,244 | B2 | 12/2015 | Ayyagari et al. | |
| 9,529,602 | B1 | 12/2016 | Swierk | |
| 9,734,169 | B2 | 8/2017 | Redlich et al. | |
| 10,176,308 | B2 | 1/2019 | Mintz et al. | |
| 10,298,670 | B2 | 5/2019 | Ben-Shaul et al. | |
| 10,404,538 | B1 * | 9/2019 | Righi | G06F 21/572 |
| 10,671,765 | B2 | 6/2020 | Swierk et al. | |
| 11,036,902 | B2 | 6/2021 | Nicholas | |
| 11,102,122 | B2 | 8/2021 | Seed et al. | |
| 11,113,046 | B1 * | 9/2021 | Bowen | G06F 9/485 |
| 11,134,380 | B2 | 9/2021 | Fox et al. | |
| 11,487,274 | B2 | 11/2022 | Valder et al. | |
| 11,792,267 | B2 | 10/2023 | Kreiner et al. | |
| 12,306,708 | B2 | 5/2025 | Thiruchengode Vajravel | |
| 2005/0229173 | A1 * | 10/2005 | Mihm | G06F 8/65 717/171 |
| 2011/0087387 | A1 | 4/2011 | Safa-Bakhsh et al. | |
| 2012/0266259 | A1 | 10/2012 | Lewis | |
| 2013/0019239 | A1 | 1/2013 | Fontignie | |
| 2013/0326039 | A1 | 12/2013 | Shah | |
| 2014/0101653 | A1 | 4/2014 | Dharmadhikari | |
| 2014/0208133 | A1 | 7/2014 | Gopal | |
| 2014/0282965 | A1 | 9/2014 | Sambamurthy | |
| 2014/0304497 | A1 | 10/2014 | Park | |
| 2017/0227995 | A1 | 8/2017 | Lee | |
| 2017/0357515 | A1 | 12/2017 | Bower, III | |
| 2018/0039946 | A1 | 2/2018 | Bolte et al. | |
| 2018/0082065 | A1 | 3/2018 | Liu | |
| 2018/0137284 | A1 | 5/2018 | Oh | |
| 2019/0042752 | A1 * | 2/2019 | Mihm | G06F 21/575 |
| 2019/0213597 | A1 | 7/2019 | Phillips | |
| 2019/0384917 | A1 | 12/2019 | Shah | |
| 2020/0133681 | A1 * | 4/2020 | Ganesan | G06F 9/4416 |
| 2021/0034048 | A1 | 2/2021 | Hajizadeh | |
| 2021/0073211 | A1 | 3/2021 | Wright, Sr. | |
| 2021/0397716 | A1 | 12/2021 | Kovah | |
| 2022/0038659 | A1 | 2/2022 | Michel | |
| 2023/0246827 | A1 | 8/2023 | Luciani, Jr. | |
| 2023/0297682 | A1 | 9/2023 | Terpstra | |
| 2023/0325535 | A1 | 10/2023 | Sharma | |
| 2023/0342446 | A1 | 10/2023 | Reddy | |
| 2024/0070329 | A1 | 2/2024 | York | |
| 2024/0241728 | A1 | 7/2024 | Gadi | |
| 2024/0259366 | A1 | 8/2024 | Karumanchi | |

OTHER PUBLICATIONS

Martin, Jim, How to update your motherboard's BIOS or UEFI, Tech Advisor, Oct. 5, 2022, 8 pages, [retrieved on Feb. 18, 2026], Retrieved from the Internet: <URL:https://www.techadvisor.com/article/725869/how-to-update-your-bios-2.html>.*

* cited by examiner

MANAGING FIRMWARE UPDATES USING OUT OF BAND METHODS

FIELD

Embodiments disclosed herein relate generally to managing data processing systems. More particularly, embodiments disclosed herein relate to systems and methods to update firmware for hardware resources of data processing systems using at least an out of band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
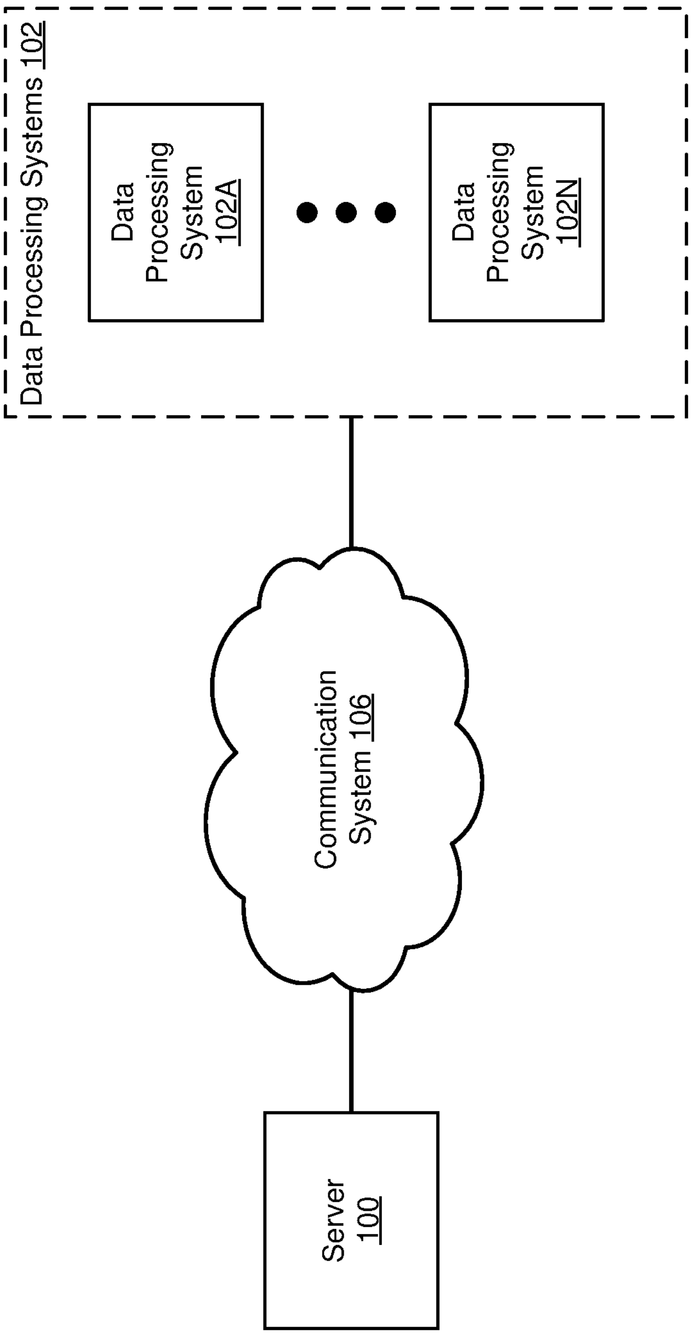
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer-implemented services. The computer-implemented services may include any quantity and type of such services. The computer-implemented services may be provided as a result of operation of hardware resources of the data processing systems, which may depend on operation of firmware for the hardware resources. Therefore, maintaining the firmware for the hardware resources (e.g., via addressing failure events and updating when needed) may support ongoing provision of the computer-implemented services as desired by downstream consumers of the computer-implemented services.

For example, maintaining the firmware may include updating the firmware in response to a firmware update event. The firmware update event may include: (i) a boot failure for a data processing system of the data processing systems, (ii) a previously scheduled firmware update, and/or other events. Updating the firmware may include obtaining an updated firmware image from a remote server via in band components of the data processing system (e.g., the hardware resources, an operating system hosted by the hardware resources, in band communication channels).

However, the in band components may be subject to failures, which may interfere with obtaining the updated firmware image. For example, hardware and/or software components of the data processing system may experience: (i) power failures, (ii) compromise due to malware, (iii) network connectivity issues, and/or (iv) other issues. Therefore, the in band components may not be reliable and/or available to download the updated firmware image when the firmware update event occurs.

To reduce downtime of the computer-implemented services in the event of a firmware update event, embodiments disclosed herein relate to methods and systems for managing firmware updates for hardware resources of a data processing system using a management controller and an out of band communication channel. The management controller and a network module that manages communication channels for the data processing system may be powered separately from hardware resources of the data processing system. Therefore, the management controller may obtain the updated firmware image (via the out of band communication channel) while the hardware resources of the data processing system are unpowered, compromised, and/or otherwise unavailable.

Specifically, the management controller may identify that a firmware update event has occurred for the hardware resources and may obtain, via the out of band communication channel and via an interaction with a remote server, the updated firmware image for the hardware resources. The management controller may validate the updated firmware image and may utilize the validated updated firmware image to perform an update process for the hardware resources to update the firmware for the hardware resources.

By doing so, embodiments disclosed herein may provide a system for managing firmware updates for hardware resources of a data processing system using out of band methods. A management controller of the data processing system may respond to firmware update events automatically regardless of a state (e.g., a power state, a connectivity state, a compromise state) of hardware resources of the data processing system and without intervention by a user of the data processing system. Thus, the data processing system may be more likely to provide computer-implemented services as desired to downstream consumers of the computer-implemented services.

In an embodiment, a method of a data processing system comprising hardware resources and a management controller that operates independently from the hardware resources is provided. The method may include: making, by the management controller, an identification that a firmware update event has occurred for the hardware resources; providing, by the management controller and via an out of band communication channel, a request for an updated firmware image for the hardware resources to a server in response to the identification; obtaining, by the management controller and via the out of band communication channel, the updated firmware image from the server in response to the providing; performing, by the management controller and using the updated firmware image, an update process for the hardware resources to modify firmware of a hardware resource of the hardware resources to obtain an updated data processing system; and providing, by the updated data processing system, computer-implemented services.

The firmware update event may be a firmware recovery event in response to a boot failure for the data processing system.

The firmware update event may be a scheduled firmware update process for the data processing system.

Performing the update process may include: validating, by the management controller, that the updated firmware image originated from a trusted source; and in an instance of the validating in which the updated firmware image is successfully validated: storing, by the management controller, the updated firmware image in non-volatile memory of the hardware resources; and performing an action set, using the updated firmware image, to modify the firmware of the data processing system.

The action set to modify the firmware of the data processing system may be performed without user intervention.

The action set may include: initiating, by the management controller, a restart of the data processing system; during the restart of the data processing system, interrupting, by the management controller, the restart of the data processing system to initiate replacement of the firmware of the hardware resource; and after the replacement of the firmware is complete, resuming, by the management controller, the restart of the data processing system.

The data processing system may include a network module adapted to separately advertise network endpoints for the management controller and the hardware resources, the network endpoints being usable by the server to address communications to the hardware resources using an in band communication channel and the management controller using the out of band communication channel.

The management controller and the network module may be on separate power domains from the hardware resources so that the management controller and the network module are operable while the hardware resources are inoperable.

The update process for the data processing system may be performed while the hardware resources are inoperable due to being unpowered.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1B:
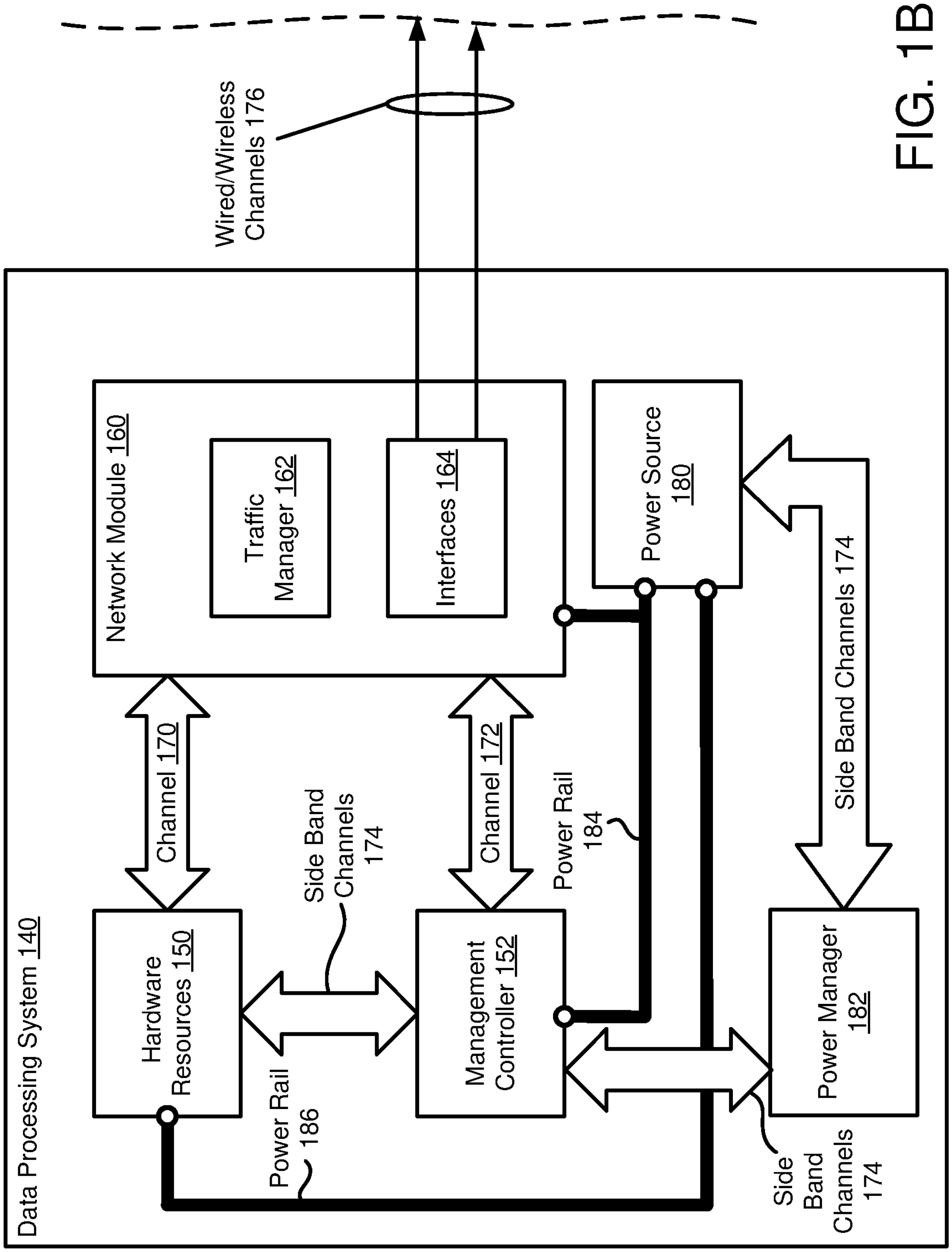
FIG. 1B shows a block diagram illustrating a data processing system in accordance with an embodiment.

Turning to FIG. 1A, a block diagram illustrating a distributed environment (e.g., system) in accordance with an embodiment is shown. The system shown in FIG. 1A may provide for management of data processing systems that may provide, at least in part, computer-implemented services. The system may include any number of data processing systems 102 (e.g., computing devices) that may each include any number of hardware components (e.g., processors, memory modules, storage devices, communications devices). The hardware components may support execution of any number and types of applications (e.g., software components). Changes in the hardware and/or software components may provide for various types of different computer-implemented services to be provided over time. Refer to FIG. 1B for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, server 100, data processing systems 102 and/or any other type of devices (not shown in FIG. 1A). Other types of computer-implemented services may be provided by the system shown in FIG. 1A without departing from embodiments disclosed herein.

To provide the aforementioned computer-implemented services, any of data processing systems 102 (e.g., 102A, 102N) may need to operate in a predetermined manner. For example, certain hardware components and/or software components may need to be operational for data processing systems 102 to provide a desired type and/or quantity of computer-implemented services. Operation of the hardware components may depend on operation of firmware for the hardware resources of a data processing system (e.g., 102A). However, due to various reasons, data processing system 102A may experience a firmware update event.

The firmware update event may include: (i) a firmware recovery event in response to a boot failure for data processing system 102A, (ii) a scheduled firmware update event for data processing system 102A, and/or (ii) other events. The firmware update event may prompt a user of data processing system 102A to download an updated firmware image via use of in band components of data processing system 102A. For example, a user may utilize functionality of an operating system hosted by data processing system 102A to request, via an in band communication channel, the updated firmware image from a remote server responsible for managing firmware updates.

However, the in band components of the data processing system (e.g., hardware components, the operating system, in band communication channels) may be compromised, inoperable, depowered, and/or otherwise unavailable for use by a user. Therefore, updates for the firmware may be delayed and/or unavailable thereby causing potential delays and/or a cessation of the computer-implemented services.

In general, embodiments disclosed herein relate to systems, devices, and methods for managing firmware update events for a data processing system using out of band methods. The data processing system may include out of band components (e.g., a management controller) that may communicate with remote systems (e.g., a server) without traversing the in band communication channels and without utilizing the in band components. For example, the management controller may request, via an out of band communication channel, an updated firmware image from a server and may verify the received updated firmware image independently from potentially inoperable in band components and potentially compromised in band communication channels.

The management controller may utilize the verified updated firmware image to initiate an update process for firmware of the hardware resources of the data processing system. By doing so, the inoperable in band components and potentially compromised in band channels may be circumvented, increasing a likelihood of effectively managing impacts of firmware update events for the data processing system.

To perform the above-mentioned functionality, the system of FIG. 1A may include data processing systems 102, server 100, and/or other components. Data processing systems 102, server 100, and/or any other type of devices not shown in FIG. 1A may perform all, or a portion of the computer-implemented services independently and/or cooperatively. Each of these components is discussed below.

Data processing systems 102 may include any number and/or type of data processing systems (e.g., 102A-102N). Any of data processing systems 102 may include in band components (e.g., hardware resources) and out of band components (e.g., a management controller), and functionality that may allow the out of band components to interact with remote systems independently from the in band components. For more information regarding out of band components of data processing systems 102, refer to the discussion of FIG. 1B.

Server 100 may be implemented using physical devices that provide firmware update services and may include an orchestrator and an internet of things (IoT) IoT hub. The orchestrator may manage firmware images, entitlement certificates, and/or other information related to data processing systems 102. For example, the orchestrator may communicate with management controllers of data processing systems 102 to implement changes to firmware for hardware resources of data processing systems 102.

The IoT hub may include a message broker service that directs communications between the orchestrator and other components of FIG. 1A. For example, the IoT hub may be responsible for providing communications from the orchestrator to a particular management controller (e.g., of data processing system 102A) over a particular communication channel of communication system 106.

Thus, firmware update events for data processing systems 102 may be initiated using out of band methods. Firmware update events (e.g., boot failures, scheduled updates) may be more likely to be detected and responded to (e.g., in a timely manner) when implementing the out of band methods versus in band methods that may rely on the availability (e.g., operability, security) of in band components and in band communication channels. By doing so, impacts of occurrences of the firmware update events for hardware components of data processing systems 102 may be more likely to be mitigated and/or prevented.

Figure 3:
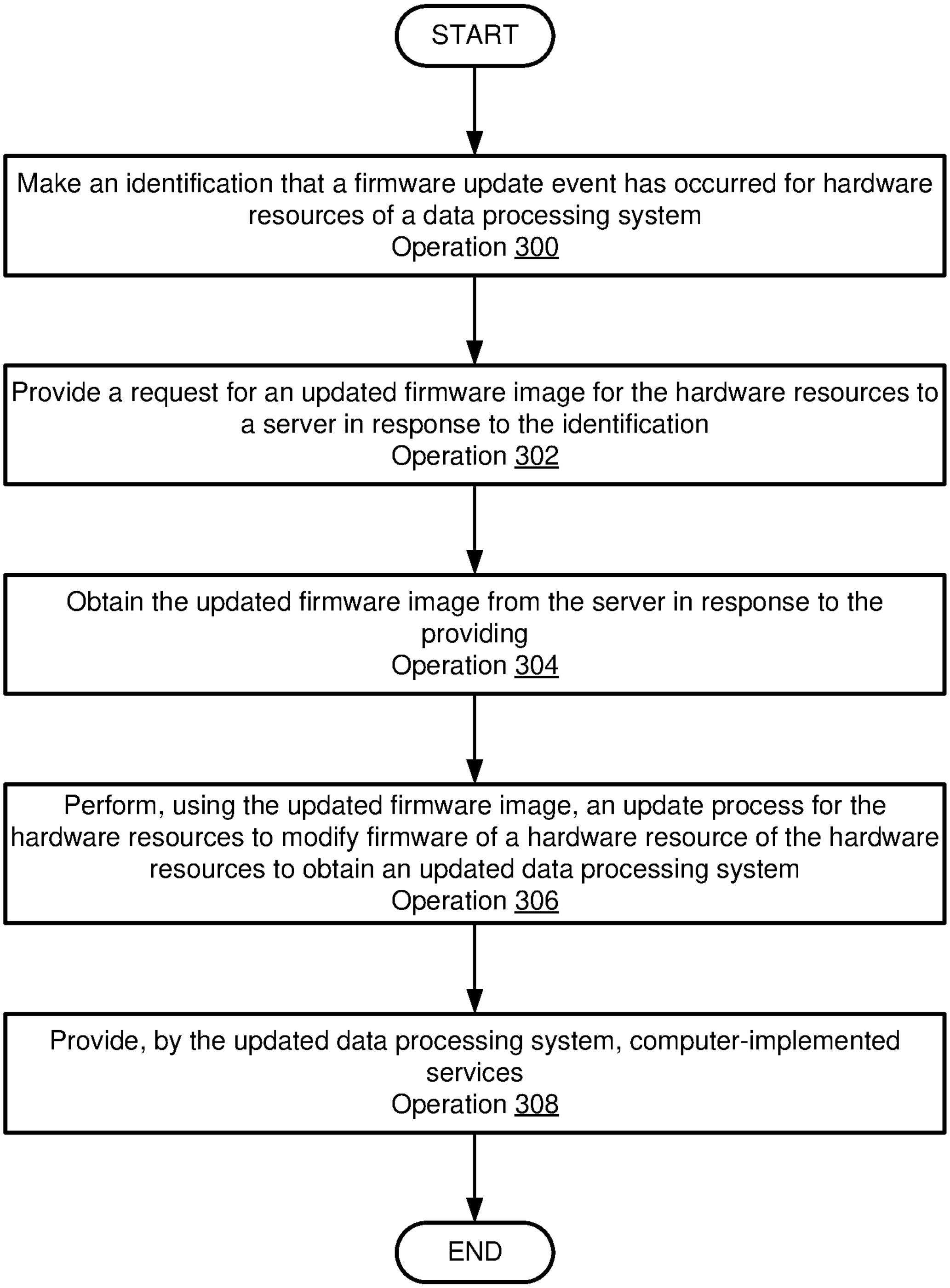
FIG. 3 shows a flow diagram illustrating a method of managing a firmware update event for hardware resources of a data processing system in accordance with an embodiment.

When providing their functionality, any of data processing systems 102, server 100, and/or other devices may perform all, or a portion of the method shown in FIG. 3.

Any of (and/or components thereof) data processing systems 102, and/or server 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of server 100 and/or data processing systems 102 are implemented using an internet of things (IoT) device, which may include a computing device. The IoT device may operate in accordance with a communication model and/or management model known to data processing systems 102, server 100, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

Communication system 106 may be implemented with one or more local communications links (e.g., a bus interconnecting a processor of any of data processing systems 102 and server 100).

Communication system 106 may include out of band communication channels, in band communication channels, and/or other types of communication channels.

Refer to FIG. 1B for additional details regarding the management controller, network module, out of band communication channel, and/or hardware resources of data processing systems 102.

While illustrated in FIG. 1A as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in band components, such as hardware resources 150, of a host data processing system 140). Management controller 152 may provide various management functionalities for data processing system 140. For example, management controller 152 may monitor various ongoing processes performed by the in band component, may manage power distribution, thermal management, and/or other functions of data processing system 140.

Figure 2:
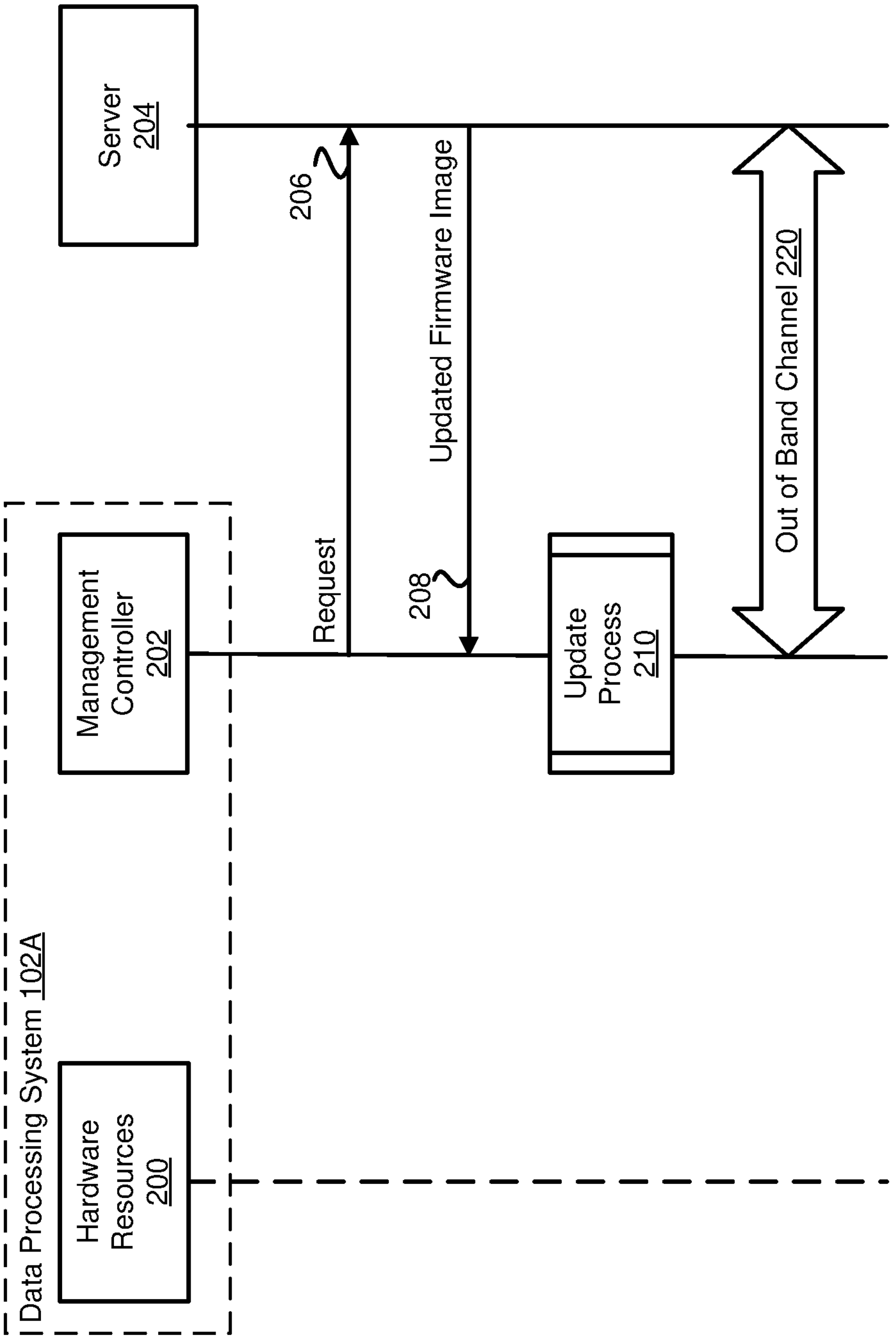
FIG. 2 shows an interaction diagram in accordance with an embodiment.

To provide its functionality, management controller 152 may: (i) make an identification that a firmware update event has occurred for hardware resources 150, (ii) provide, via channel 172 (e.g., an out of band communication channel), a request for an updated firmware image to a server in response to the identification, (iii) obtaining, via channel 172, the updated firmware image from the server in response to the providing, (iv) performing, using the updated firmware image, an update process for the hardware resources to modify firmware of a hardware resource of hardware resources 150 to obtain an updated data processing system, and/or (v) perform other actions. Refer to FIG. 2 for additional details regarding actions performed by management controller 152 to manage firmware update events.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in band components and out of band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in band components. Likewise, outbound traffic from the out of band component may never flow through the in band components.

For example, during communications with a remote system (e.g., server 100), messages from server 100 may be addressed to a network endpoint advertised by network module 160 for out of band communications. The message may include information needed to manage firmware update events for hardware resources 150, such as an updated firmware image. Once the message is received by traffic manager 162, traffic manager 162 may forward the message to management controller 152 via an out of band communication channel (e.g., channel 172), differentiating the message from in band communications to data processing system 140. The message obtained by data processing system 140 using out of band methods may be more likely to be obtained (e.g., securely obtained, timely obtained) by data processing system 140 than when using in band methods that may be unavailable or compromised.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a WiFi card, a wireless local area network card, a wired local area network card, an optical communication card, and/or other types of communication components. These components may support any number of wired/wireless channels 176.

Thus, from the perspective of an external device, the in band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

Therefore, if hardware resources 150 become unavailable (e.g., due to being unpowered) then out of band components may remain powered, allowing management of firmware update events while hardware resources 150 are inoperable. For example, management controller 152 may communicate with remote systems in order to obtain information usable to manage the firmware update event, authenticate the information, and/or initiate update processes using the information.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, data processing system 140 may perform all, or a portion, of the methods and operations illustrated in FIGS. 2-3.

While illustrated in FIG. 1B with a limited number of specific components, a system may include additional, fewer, and/or different components without departing from embodiments disclosed herein.

As discussed above, the components of FIGS. 1A-1B may perform various methods to manage firmware update events for hardware resources of data processing systems that perform computer-implemented services. FIGS. 2-3 may illustrate examples of methods that may be performed by the components of FIGS. 1A-1B. For example, a management controller and/or other component of a data processing system may perform all or a portion of the methods. In the diagrams discussed below and shown in FIGS. 2-3, any of the operations may be repeated, performed in different orders, and/or performed in parallel with or in a partially overlapping in time manner with other operations.

To further clarify embodiments disclosed herein, an interaction diagram in accordance with an embodiment is shown in FIG. 2. The interaction diagram may illustrate an example of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 200, 202, etc.), located towards the top of each figure. Lines descend from these shapes. Processes performed by the components of the system are illustrated using a second set of shapes (e.g., 210) superimposed over these lines.

Interactions (e.g., communication, data transmissions, etc.) between the components of the system are illustrated using a third set of shapes (e.g., 206, 208, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 206 may occur prior to the interaction labeled as 208. However, it will be appreciated that the processes and interactions may be performed in different orders, any may be omitted, and other processes or interactions may be performed without departing from embodiments disclosed herein.

The lines descending from some of the first set of shapes (e.g., 200) is drawn in dashing to indicate, for example, that the corresponding components may not be (i) operable, (ii) powered on, (iii) present in the system, and/or (iv) not participating in operation of the system for other reasons.

The processes shown in FIG. 2 may be performed by any entity shown in the systems of FIGS. 1A-1B (e.g., a device similar to one of data processing systems 102, systems similar to server 100, etc.) and/or another entity without departing from embodiments disclosed herein.

Turning to FIG. 2, an interaction diagram in accordance with an embodiment is shown. The interaction diagram may illustrate processes and interactions that may occur when managing firmware update events for hardware resources of a data processing system. For example, data processing system 102A may provide computer-implemented services. As discussed with respect to FIGS. 1A-1B, data processing system 102A may include hardware resources 200 and management controller 202. Hardware resources 200 may be similar to hardware resources 150 described in FIG. 1B and management controller 202 may be similar to management controller 152 described in FIG. 1B.

Data processing system 102A may provide the computer-implemented services while firmware for hardware resources 200 facilitates operation of hardware resources 200. However, firmware update events may occur for hardware resources 200 thereby potentially interrupting the computer-implemented services. The firmware update events may include: (i) a firmware recovery event in response to a boot failure for data processing system 102A, (ii) a scheduled firmware update process for data processing system 102A, and/or (iii) other events.

The boot failure may occur due to unavailability and/or corruption of data used during a start up process for data processing system 102A, a failure to successfully validate one or more components during the start up process for data processing system 102A, and/or for other reasons. The scheduled firmware update process may occur due to, for example, a manufacturer of data processing system 102A generating a firmware update and scheduling a date and/or time for the firmware update to be pushed to data processing system 102A.

The firmware update event may render hardware resources 200 inoperable (e.g., indicated by the dashed line descending from hardware resources 200). As management controller 202 may remain operable despite impaired operation of hardware resources 200, management controller 202 may identify the occurrence of the failure (and/or other indicator of the firmware update event). The occurrence of the firmware update event may prompt management controller 202 to initiate a firmware update process for the management entity of data processing system 102A.

Management controller 152 may initiate the firmware update process while hardware resources 200 are inoperable. The firmware update process may be initiated and/or performed automatically based on the identification of the failure and/or for other scheduled firmware update and, therefore, may be initiated without user intervention (e.g., a user may not need to manually approve and/or facilitate the firmware update process).

At interaction 206, a request (for an updated firmware image) may be provided to server 204 (e.g., via an IoT hub of server 204) by management controller 202. Server 204 may be similar to server 100 described in FIG. 1A. For example, the request may be generated by management controller 202 and may be provided to server 204 via out of band channel 220 through (i) transmission via a message, (ii) storing in a storage with subsequent retrieval by server 204, (iii) a publish-subscribe system where server 204 subscribes to updates from management controller 202 thereby causing a copy of the request to be propagated to server 204, and/or (iv) other processes. Out of band channel 220 may be similar to channel 172 described in FIG. 1B. By providing the request to server 204, server 204 may assist in initiating the firmware update process for hardware resources 200 of data processing system 102A.

The request (for the updated firmware image) may include, for example, (i) a message indicating that the updated firmware image is requested, (ii) a device identifier for data processing system 102A, and/or (iii) other data (e.g., authentication information, information regarding the failure, etc.).

Using information included in the request, server 204 may (i) perform authentication processes for data processing system 102A and/or the request, (ii) identify the updated firmware image, (iii) identify policies for data processing system 102A that may specify whether data should be requested from data processing system 102A (e.g., a backup of critical data stored by data processing system 102A), and/or (iv) perform other actions (e.g., according to policies for data processing system 102A). Server 204 may respond to the request by obtaining (e.g., generating) a data package that may include the updated firmware image.

The updated firmware image may include a cryptographically verifiable data structure that includes information usable to initiate a firmware update process for data processing system 102A. For example, the updated firmware image may be signed using a private key of a trusted public private key pair (e.g., a public private key pair maintained by a manufacturer of data processing system 102A, a public private key pair maintained by server 204, etc.). In other words, the updated firmware image may be generated so that it may be authenticated by management controller 202 during a verification process.

At interaction 208, the updated firmware image (e.g., the data package) may be provided to management controller 202 by server 204 (e.g., via the IoT hub). For example, the updated firmware image may be provided to management controller 202 via out of band channel 220 through (i) transmission via a message, (ii) storing in a storage with subsequent retrieval by management controller 202, (iii) a publish-subscribe system where management controller 202 subscribes to updates from server 204 thereby causing a copy of the updated firmware image to be propagated to management controller 202, and/or (iv) other processes.

Upon obtaining the data package (e.g., including the updated firmware image), management controller 152 may perform update process 210. Update process 210 may be performed while hardware resources 200 are inoperable. Update process 210 may include validating that the updated firmware image originated from a trusted source. For example, management controller 202 may utilize a public key of the trusted public private key pair to validate that a signature of the signed updated firmware image is signed using the private key of the trusted public private key pair. The public key of the trusted public private key pair may be previously provided to management controller 202, may be provided as part of the data package, and/or otherwise may be obtained by management controller 202 in order to perform the validation of the signed updated firmware image. If management controller 202 is able to validate the signature, management controller 202 may store the updated firmware image in non-volatile memory of hardware resources 200 (not shown).

Management controller 202 may also perform, as part of update process 210 and using the updated firmware image, an action set to modify the firmware of at least a portion of hardware resources 200. The action set may be performed without user intervention (e.g., may be performed automatically and without prompting a user to initiate, approve and/or otherwise participate in the action set).

As part of performing the action set, management controller 202 may perform various actions including, for example: (i) initiating a restart of data processing system 102A, (ii) during the restart of data processing system 102A, interrupting the restart of data processing system 102A to initiate replacement of the firmware of the hardware resources, (iii) after the replacement of the firmware is complete, resuming the restart of data processing system 102A.

Thus, as shown in the example of FIG. 2, firmware update events for a data processing system may be managed using an updated firmware image obtained via out of band methods. Out of band components of the data processing system may identify and respond to firmware update events for the data processing system automatically and/or in real-time, without user intervention, without presence of a management entity (e.g., an operating system), and/or when the data processing system is powered off (or in a low-powered state). By doing so, impacts of the firmware update events may be managed without relying on user intervention and/or functionality of in band components of the data processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2 may perform various methods to manage firmware update events for data processing systems using out of band methods. By doing so, impacts of the firmware update events of the data processing systems may be managed (e.g., reduced, prevented) in a timely and trustworthy manner.

Turning to FIG. 3, a flow diagram illustrating a method of managing a firmware update event for hardware resources of a data processing system in accordance with an embodiment is shown. In the diagrams discussed below and shown in FIG. 3, any of the operations may be repeated, performed in different orders, and/or performed in parallel with or in a partially overlapping in time manner with other operations. The method described with respect to FIG. 3 may be performed by a data processing system (e.g., data processing system 102A), any component of data processing system 102A (e.g., a management controller, hardware resources), a server, and/or another device.

At operation 300, an identification is made that a firmware update event has occurred for hardware resources of a data processing system. Making the identification may include: (i) reading an error message (e.g., generated due to the firmware update event), (ii) monitoring activity of the hardware resources to identify a change (e.g., impairment) in their operation, and/or (iii) by other methods.

For example, the firmware update event may include a boot failure for the data processing system. The boot failure may be identified, for example, by a management controller of the data processing system by (i) snooping activity of the hardware resources, (ii) obtaining (e.g., fetching, receiving, via a side band channel connecting hardware resources to the management controller) a message indicating that the boot failure has occurred, and/or (iii) reading the content of the message.

At operation 302, a request for an updated firmware image for the hardware resources is provided to a server in response to the identification. The request may be provided to the server using methods similar to those described with respect to FIG. 2 (e.g., interaction 206) and/or by other methods. For example, the request may be generated based on (e.g., in response to) the identification of the occurrence of the boot failure and may be provided as a message to the server via an out of band communication channel.

At operation 304, the updated firmware image is obtained from the server in response to the providing. The updated firmware image may be obtained using methods similar to those described with respect to FIG. 2 (e.g., interaction 208) and/or by other methods. For example, the updated firmware image may be obtained as a message via the out of band communication channel.

At operation 306, an update process is performed for the hardware resources, using the updated firmware image, to modify firmware of a hardware resource of the hardware resources to obtain an updated data processing system. Performing the update process may include validating that the updated firmware image originated from a trusted source. If the updated firmware image is successfully validated, performing the update process may also include: (i) storing the updated firmware image in non-volatile memory of the hardware resources, (ii) performing an action set, using the firmware image, to modify the firmware of the hardware resources, and/or (iii) other methods.

Validating that the updated firmware image originated from a trusted source may include: (i) identifying and/or obtaining a public key of the trusted public private key pair, and (ii) authenticating the updated firmware image using the public key.

Authenticating the updated firmware image may include using the public key to validate that the signed updated firmware image is signed using the private key of the trusted public private key pair. For example, validating the updated firmware image may include verifying that a payload of the updated firmware image has not been modified after signing.

Validating that the updated firmware image originated from a trusted source may also include: (i) obtaining hash of a known good copy of the updated firmware image, (ii) performing a one way function to compute a hash of the updated firmware image obtained in operation 304 from the server, (iii) comparing the hash of the known good copy of the updated firmware image to the computed hash of the updated firmware image to determine whether the payload (e.g., the updated firmware image) has been modified, and/or (iv) other methods.

Storing the updated firmware image in non-volatile memory of the hardware resources may include: (i) providing, via a side band communication channel of the data processing system, the updated firmware image to the hardware resources, (ii) providing instructions to the hardware resources (e.g., also via the side band communication channel) indicating a storage destination (e.g., a portion of the non-volatile memory) for the updated firmware image, (iii) performing a storage process to store the updated firmware image in the non-volatile storage of the hardware resources, and/or (iv) other methods.

Performing the action set may include: (i) initiating a restart of the data processing system, (ii) during the restart, interrupting the restart to initiate replacement of the firmware of the hardware resource, (iii) after the replacement of the firmware is complete, resuming the restart of the data processing system, and/or (iv) other methods.

Initiating the restart of the data processing system may include sending a request, instruction, and/or other information to a management entity for the hardware resources to initiate the restart process. For example, the management controller may directly and/or indirectly close software applications, save and/or re-allocate data, initiate depowering of the hardware resources, etc.

Interrupting the restart may include suspending normal actions performed during the restart. The restart may be interrupted prior to performance of a portion of the restart where firmware begins to operate. Interrupting the restart may also include providing instructions for replacement of current firmware of the hardware resources with the updated firmware image.

Resuming the restart may include running a bootloader software application, instructing management entities (e.g., the BIOS, a power manager) to power the hardware resources and utilize the updated firmware to complete the restart, and/or other actions.

At operation 308, computer-implemented services are provided by the updated data processing system. Providing the computer-implemented services may include hosting software applications that may, in part, provide the computer-implemented service by executing instructions provided via the hosted software.

The method may end following operation 308.

As illustrated above, embodiments disclosed herein may provide systems and methods usable to manage firmware update events for data processing systems. An update process may be initiated in order to manage the firmware update event. Initiation and performance of the firmware update process may be performed, at least in part, using out of band methods so that inoperable in band components and/or potentially compromised in band channels may be circumvented. By doing so, the impacts of occurrences of the firmware update events may be managed in a more effective manner than when relying on the in band methods.

The occurrences of the firmware update events may be managed automatically and/or in real-time (e.g., without relying on user intervention), reducing the likelihood of service disruptions, and/or security issues that may arise while managing the firmware update events. Accordingly, the disclosed process provides for both an embodiment in computing technology and an improved method for managing the security of data processing systems.

Figure 4:
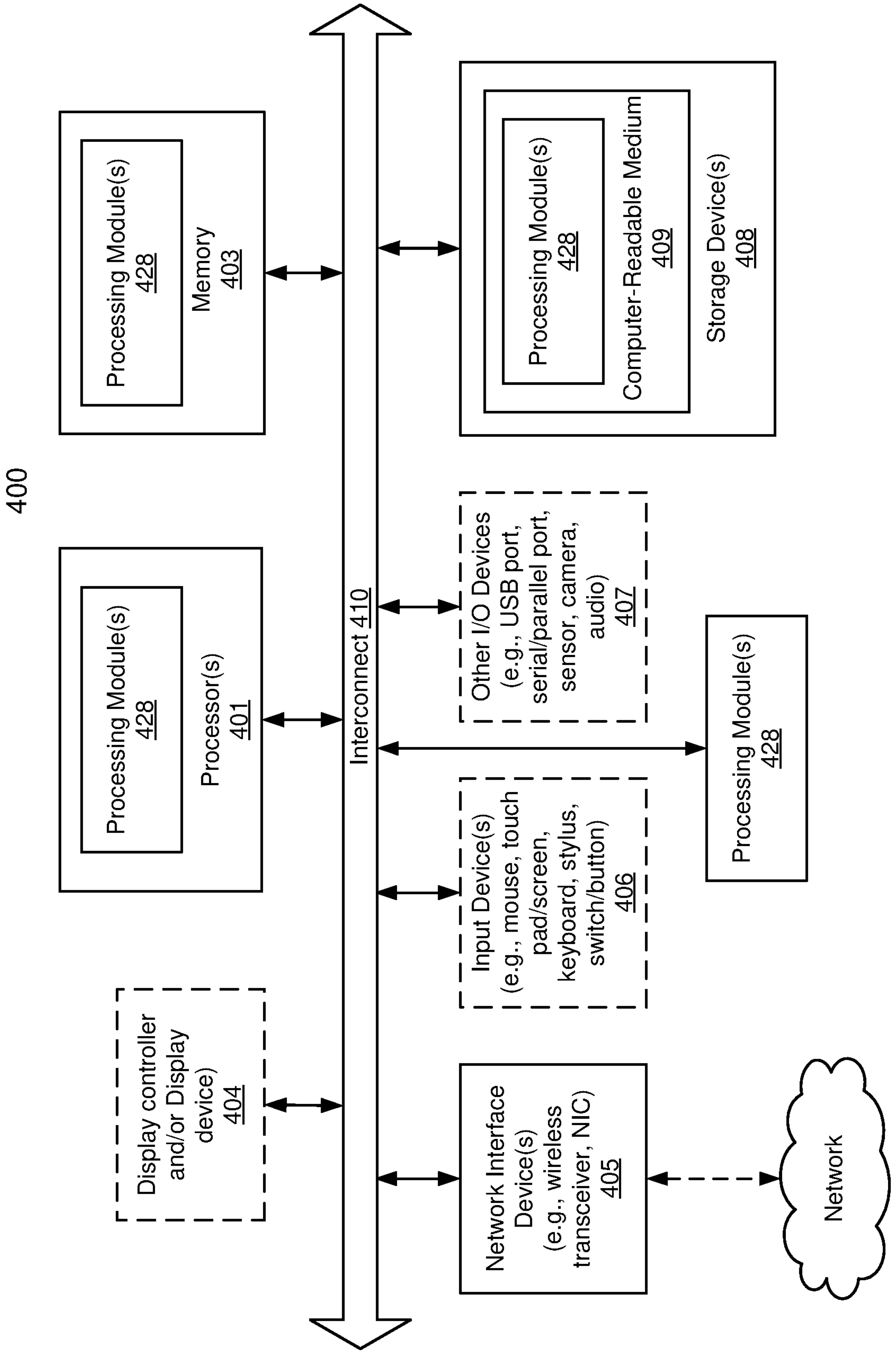
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/ logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data processing system comprising hardware resources and a management controller that operates independently from the hardware resources, the method comprising:

making, by the management controller, an identification that a firmware update event has occurred for the hardware resources;

providing, by the management controller and via an out of band communication channel, a request for an updated firmware image for the hardware resources to a server in response to the identification;

obtaining, by the management controller and via the out of band communication channel, the updated firmware image from the server in response to the providing;

performing, by the management controller and using the updated firmware image, an update process for the hardware resources to modify firmware of a hardware resource of the hardware resources to obtain an updated data processing system; and providing, by the updated data processing system, computer-implemented services, wherein the update process comprises:

initiating, by the management controller, a restart of the data processing system;

during the restart of the data processing system, interrupting the restart to initiate replacement of the firmware; and after the replacement of the firmware is complete, resuming, by the management controller, the restart of the data processing system.

2. The method of claim 1, wherein the firmware update event is a firmware recovery event in response to a boot failure for the data processing system.

3. The method of claim 1, wherein the firmware update event is a scheduled firmware update process for the data processing system.

4. The method of claim 1, further comprising:

validating, by the management controller, that the updated firmware image originated from a trusted source; and storing, by the management controller, the updated firmware image in non-volatile memory of the hardware resources.

5. The method of claim 1, wherein the update process is performed without user intervention.

6. The method of claim 1, wherein the data processing system comprises a network module adapted to separately advertise network endpoints for the management controller and the hardware resources, the network endpoints being usable by the server to address communications to the hardware resources using an in band communication channel and the management controller using the out of band communication channel.

7. The method of claim 6, wherein the management controller and the network module are on separate power domains from the hardware resources so that the management controller and the network module are operable while the hardware resources are inoperable.

8. The method of claim 7, wherein the update process for the data processing system is performed while the hardware resources are inoperable due to being unpowered.

9. The method of claim 6, wherein the out of band communication channel runs through the network module, and an in band communication channel that services the hardware resources also runs through the network module.

10. The method of claim 6, wherein the network module hosts a transmission control protocol/internet protocol (TCP/IP) stack to facilitate network communications via the out of band communication channel.

11. A non-transitory machine-readable medium having instructions stored therein, which when executed by a processor, cause the processor to perform operations for managing a data processing system comprising hardware resources and a management controller that operates independently from the hardware resources, the operations comprising:

making, by the management controller, an identification that a firmware update event has occurred for the hardware resources;

providing, by the management controller and via an out of band communication channel, a request for an updated firmware image for the hardware resources to a server in response to the identification;

obtaining, by the management controller and via the out of band communication channel, the updated firmware image from the server in response to the providing;

performing, by the management controller and using the updated firmware image, an update process for the hardware resources to modify firmware of a hardware resource of the hardware resources to obtain an updated data processing system; and providing, by the updated data processing system, computer-implemented services, wherein the update process comprises:

initiating, by the management controller, a restart of the data processing system;

during the restart of the data processing system, interrupting the restart to initiate replacement of the firmware; and after the replacement of the firmware is complete, resuming, by the management controller, the restart of the data processing system.

12. The non-transitory machine-readable medium of claim 11, wherein the firmware update event is a firmware recovery event in response to a boot failure for the data processing system.

13. The non-transitory machine-readable medium of claim 11, wherein the firmware update event is a scheduled firmware update process for the data processing system.

14. The non-transitory machine-readable medium of claim 11, wherein the operations further comprise:

validating, by the management controller, that the updated firmware image originated from a trusted source; and storing, by the management controller, the updated firmware image in non-volatile memory of the hardware resources.

15. The non-transitory machine-readable medium of claim 11, wherein the update process is performed without user intervention.

16. A data processing system, comprising:

a processor; and a memory coupled to the processor to store instructions, which when executed by the processor, cause the processor to perform operations for managing the data processing system comprising hardware resources and a management controller that operates independently from the hardware resources, the operations comprising:

making, by the management controller, an identification that a firmware update event has occurred for the hardware resources;

providing, by the management controller and via an out of band communication channel, a request for an updated firmware image for the hardware resources to a server in response to the identification;

obtaining, by the management controller and via the out of band communication channel, the updated firmware image from the server in response to the providing;

performing, by the management controller and using the updated firmware image, an update process for the hardware resources to modify firmware of a hardware resource of the hardware resources to obtain an updated data processing system; and providing, by the updated data processing system, computer-implemented services, wherein the update process comprises:

initiating, by the management controller, a restart of the data processing system;

during the restart of the data processing system, interrupting the restart to initiate replacement of the firmware; and after the replacement of the firmware is complete, resuming, by the management controller, the restart of the data processing system.

17. The data processing system of claim 16, wherein the firmware update event is a firmware recovery event in response to a boot failure for the data processing system.

18. The data processing system of claim 16, wherein the firmware update event is a scheduled firmware update process for the data processing system.

19. The data processing system of claim 16, the operations further comprising:

validating, by the management controller, that the updated firmware image originated from a trusted source; and storing, by the management controller, the updated firmware image in non-volatile memory of the hardware resources.

20. The data processing system of claim 16, wherein the update process is performed without user intervention.

* * * * *